G. H. Corliss.
Steam Cut-Off Gear.
No. 760. Reissued July 12, 1859.
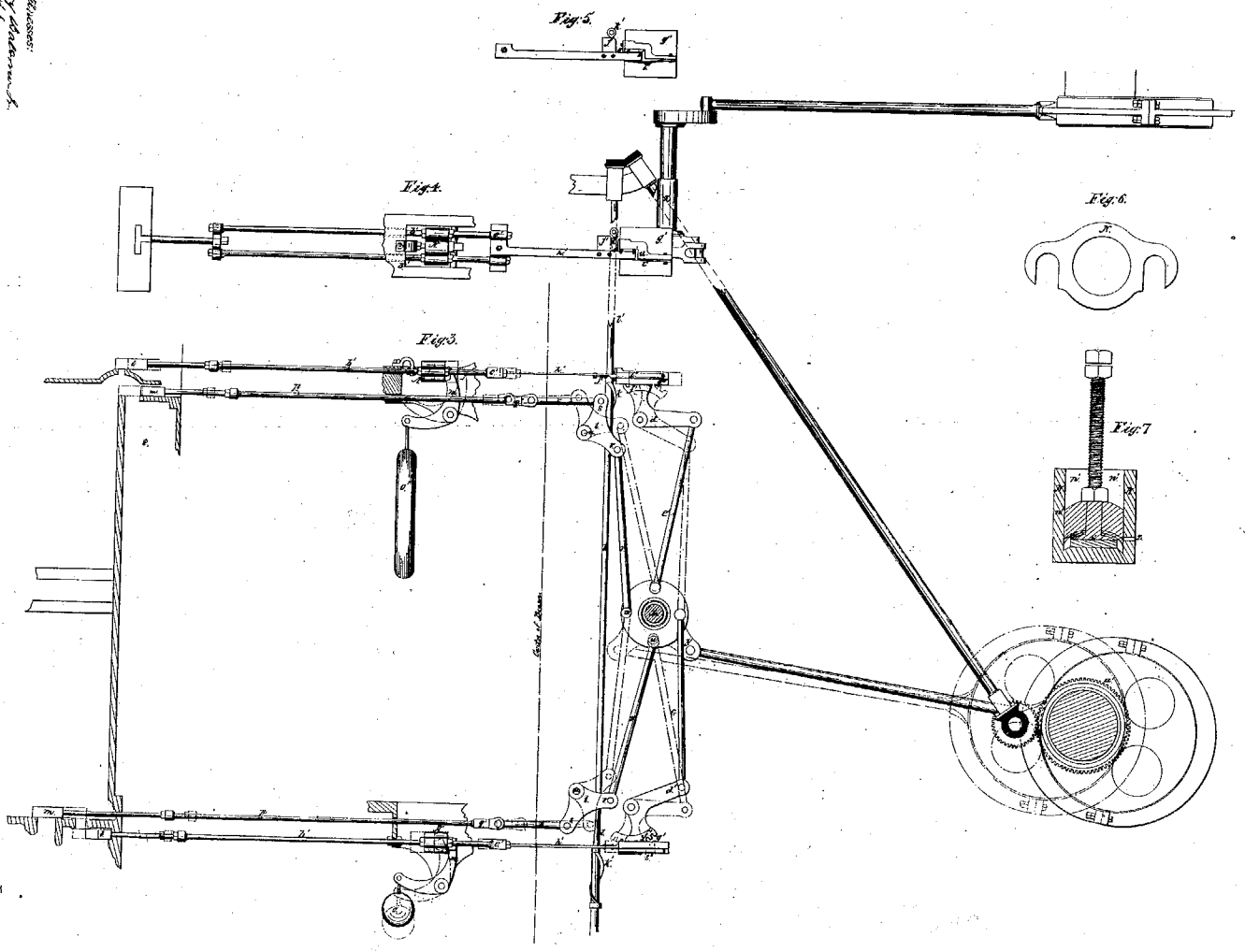
Witnesses:
Henry Bateman Jr.
R. Hampshire
Inventor:
George H. Corliss
N. PETERS, PHOTO-LITHOGRAPHER, WASHINGTON, D. C.

UNITED STATES PATENT OFFICE.

GEORGE H. CORLISS, OF PROVIDENCE, RHODE ISLAND.

IMPROVEMENT IN CUT-OFF AND WORKING VALVES OF STEAM-ENGINES.

Specification forming part of Letters Patent No. 6,162, dated March 10, 1849; Reissue No. 200, dated May 13, 1851; Reissue No. 760, dated July 12, 1859.

*To all whom it may concern:*

Be it known that I, GEORGE H. CORLISS, of the city and county of Providence, and State of Rhode Island, have invented a new and useful Method of Arresting the Movement of Valves in Engines; and I do hereby declare that the following is a full, clear, and exact description of the same, reference being had to the accompanying drawings, in which—

Figure 3 represents in elevation the valve mechanism of a beam-engine to which my improvement has been applied. Fig. 4 is a top view of certain portions of the same, and Fig. 5 a view of certain parts of the valve-gear detached from the remainder; Fig. 6, an end view of the air-cylinder, and Fig. 7 a section through the axis of the air-cylinder and piston.

The invention which is the subject of this patent is applicable to engines in which a liberating valve-gear is used, and the valves are closed independently of the power of the engine, and its object is to arrest the movement of the liberated valves and that of the parts with which they are connected without injurious jar or concussion. My method of accomplishing this result consists in inclosing a quantity of air in a vessel by the movement of devices connected with the valve-gear in such manner that the valve cannot close without the compression of this inclosed air, which forms an elastic cushion to retard the movement of the parts and prevent jar.

This invention is represented in the accompanying drawings as applied to the valve apparatus of an engine embodying other inventions, for which patents bearing even date herewith have been granted to me. As, however, it may be applied with greater or less advantage to valve apparatus which does not embody these inventions, and as these may be used independently of it, I shall in the present specification describe only so much of the mechanism of the steam-engine as I deem necessary to communicate a clear understanding of the invention which is the subject of this patent.

The mechanism represented in the accompanying drawings for operating the steam-valves *l l* is constructed in parts, one of which is connected permanently with each valve, while the other part is connected with an eccentric, so that it is constantly moved by the power of the engine while the latter is in operation. The part of this valve gear connected permanently with each valve consists of a double valve-rod, *b′*, upon which a weight, *o′*, is arranged to act through the intervention of a bent lever or bell-crank, *m′*, to cause the valve to close its port whenever the part of the valve-gear connected with it is separated from the remainder of the valve-gear. The other part of the valve-gear consists, in this instance, of the sliding blocks *g′ g′*, the bell-cranks *f′ f′*, having teeth that engage with corresponding teeth in the blocks, the wrist-plate *x* and its appurtenances, and the eccentric with its appurtenances, which, in its revolution, causes the sliding blocks to traverse to and fro. The part of the valve-gear connected permanently with each valve is fitted with a variable link, *h′*, which is hinged to the valve-rod *b′*, and has an acting-face, *c*, which can be placed in contact with a corresponding face, *e*, formed upon the adjacent sliding block *g′*. When these two faces are in contact, the part of the valve-gear connected permanently with the valve is moved along with the remainder, so that the valve is drawn open by the power of the engine; and, as the weight *o′* is constantly tending to move the valve back over its port, the two faces remain in contact until a separation is made by a lateral movement of one to the other. Such a lateral movement is effected, in the present example, when steam is to be cut off, by means of a cam, *k′*, which is turned by the power of the engine, through the intervention of a series of shafts and wheels, the last of which is secured to the crank-shaft; and, as in this engine the shank of the link is not within the range of motion of the cam, a projection, *j′*, is secured to the link upon which the cam bears, when the separation of one part of the valve-gear from the other and the consequent liberation of the steam-valve from the control of the power of the engine takes place.

In order to arrest the movement of the valve, the weights, and the parts connected therewith after liberation, a cross-block, N, having a cylindrical socket, *n′*, formed in it and opening toward the valve, (it is shown on a large scale at Figs. 6 and 7,) is secured to each valve rod, and a piston, *p′*, is secured to the engine-frame in such a position that it enters the cylindrical socket and incloses air therein as the weight *o′* falls. The piston fits the cylinder sufficiently close to prevent the free escape of the inclosed air, so that the latter is compressed by the piston and opposes the elastic resistance of an air-cushion to arrest the movement of the parts and bring them gradually to rest. An orifice, *z*, is made in the side of the cylinder near its bottom to permit the free escape of the air therefrom until the piston has advanced nearly to the bottom of the cylinder, which position it reaches about the time the steam-valve closes its port, when the air-piston, passing the orifice in its cylinder, closes it to prevent the further escape of the air, which, by the continued movement of the piston, may be compressed until it has sufficient elastic force to counterbalance the momentum and bring to rest the liberated valve and the parts of the valve-gear connected therewith.

In order that each steam-valve may uncover its port at the proper moment to admit steam to the cylinder the adjacent member of the part of the valve-gear appertaining to the eccentric, which in this instance is the sliding block $g'$, is moved back by the turning of the eccentric by the power of the engine into such a position that the link $h'$ can be moved laterally to place its acting-face within the range of motion of the face upon the sliding block when the latter is again moved to draw the valve along. This movement of the valve-gear takes place before the piston is ready to make its stroke from the adjacent end of the cylinder, and the lateral movement of the link is effected by a spring, $i''$. In the example thus described the liberation of the valves whose motions are arrested is effected by the instrumentality of a cam and the closing by the instrumentality of weights. These, however, constitute no part of my present invention, as the form and construction of the valve and valve-gear may be varied indefinitely, as well as the means for imparting the closing movement to the valves, without changing substantially the method of arresting their movement after liberation takes place.

What I claim as my invention, and desire to secure by Letters Patent, is—

The combination, substantially as described, of an air-cushion with the liberating valve-gear of steam-engines.

In testimony whereof I have hereunto subscribed my name.

GEORGE H. CORLISS.

Witnesses:

HENRY BALDWIN, Jr.,

JOHN S. HOLLINGSHEAD.